United States Patent [19]

McGraw

[11] Patent Number: 5,021,180

[45] Date of Patent: Jun. 4, 1991

[54] POLYGLYCOL LUBRICANTS FOR REFRIGERATION COMPRESSORS

[75] Inventor: Philip W. McGraw, Lake Jackson, Tex.

[73] Assignee: The Dow Chemical Company, Midland, Mich.

[21] Appl. No.: 432,958

[22] Filed: Nov. 7, 1989

Related U.S. Application Data

[63] Continuation-in-part of Ser. No. 298,534, Jan. 18, 1989, abandoned.

[51] Int. Cl.$^5$ ...................... C09K 5/04; C10M 129/08
[52] U.S. Cl. .......................................... 252/68; 252/51
[58] Field of Search ..................... 252/51, 68

[56] References Cited

U.S. PATENT DOCUMENTS

| 317,770 | 3/1928 | Johnson | 568/679 |
|---|---|---|---|
| 4,061,684 | 12/1977 | Helfert | 252/52 A |
| 4,248,726 | 2/1981 | Uchinuma et al. | |
| 4,267,064 | 5/1981 | Sasaki et al. | |
| 4,302,343 | 11/1981 | Carswell et al. | |
| 4,428,854 | 1/1984 | Enjo et al. | |
| 4,431,557 | 2/1984 | Shimizu et al. | |
| 4,454,052 | 6/1984 | Shoji et al. | |
| 4,755,316 | 7/1988 | Magid et al. | |
| 4,851,144 | 7/1989 | McGraw | 252/68 |

FOREIGN PATENT DOCUMENTS 51795  3/1982  Japan .

OTHER PUBLICATIONS

Research Disclosure 17463; Research Disclosure Oct. 1978.

H. H. Kruse et al. "Fundamentals of Lubrication in Refrigerating Systems and Heat Pumps" pp. 763–783, ASHRAE Transactions vol. 90, Part 2B, 1984.

K. S. Sanvordenker et al., "A Review of Synthetic Oils for Refrigeration Use" ASHRAE Symposium, Nassau, Jun. 29, 1972.

Primary Examiner—Jacqueline V. Howard
Assistant Examiner—Jerry D. Johnson

[57] ABSTRACT

A refrigeration fluid compositions for compression refrigeration which have an upper solution critical temperature equal to or greater than 60° C. are composed of (A) selected hydrochlorofluorocarbons and hydrofluorocarbons and (B) polyether polyols having viscosities of greater than 80 centistokes at 38° C. and having a number average molecular weight from about 400 to about 2000 wherein the polyols are the residue of an active hydrogen compound such as glycerine or ethylene diamine.

15 Claims, No Drawings

POLYGLYCOL LUBRICANTS FOR REFRIGERATION COMPRESSORS

CROSS REFERENCE TO RELATED APPLICATIONS

This application is a continuation-in-part of Ser. No. 07/298,534 filed Jan. 18, 1989, now abandoned.

FIELD OF THE INVENTION

This invention relates to compositions of polyglycols with hydrofluorocarbon and hydrochlorofluorocarbon refrigerants which are useful for lubricating heat pumps and air conditioning compressors.

Refrigerant R12 (dichlorodifluoromethane) is used in automotive air conditioners and many other types of refrigeration and air conditioning compressors. It is a chlorofluorocarbon that has been identified as depleting atmospheric ozone. The Montreal Accord restricts the production of R12 by 1990. Refrigerant R134a (1,1,1,2-tetrafluoroethane) has a vapor pressure that is very similar to R12 and it has the advantage that it does not deplete atmospheric ozone. R134a can replace R12 in most refrigeration systems without major redesign of present equipment. It could be used in automotive air conditioners without any or with minor re-tooling by the automotive companies.

The major problem of using R134a is that conventional lubricants such as naphthenic mineral oils are not soluble over the temperature range −20° to 80° C., the operating temperatures encountered in the different refrigeration applications. Some polyglycols are soluble in R134a at 25° C. and below but phase separate below 60° C. Phase separation of the lubricant from the refrigerant can cause poor lubrication of the compressor which results in increased wear and decreased compressor life. It is well known in the refrigeration industry that lubricant concentration in the refrigerant is limited to the preferred range of about 10 to 20 weight % due to thermodynamic considerations. However, a range of 1 to 25 weight % is considered to be useful in this invention.

The usefulness of this invention is that it will enable compressor manufacturers to substitute R134a and other hydrofluorocarbons or hydrochlorofluorocarbons for chlorofluorocarbons such as R12 in most compressors without mechanical modification to existing compressors and be able to operate over a broad temperature range.

DESCRIPTION OF THE PRIOR ART

The fundamentals of lubrication in air conditioners are set forth by H. H. Kruse et al. in "Fundamentals of Lubrication in Refrigeration Systems and Heat Pumps" pages 763–783: ASHRAE Transactions Vol 90 part 2B (1984). This reference is incorporated by reference herein.

Lubricants for various refrigeration compressors are U.S. Pat. No. 4,248,726. This patent shows polyether polyols or polyglycols with functionalitied of 1 to 6 are useful as refrigeration lubricants with various refrigerants such as R11, R12, R22 and the like. The polyglycols can have free OH groups or can be ether or ester capped and they contain an acid scavenging additive package. These fluids must have a viscosity of 50 to 200 cs at 98.8° C. and a viscosity index of at least 150. The focus of this patent is an additive package that prevents the degradation of the high viscosity polyglycols in a rotary type refrigerators. The high molecular weight polyglycols of this patent are insoluble in R134a at 25° C.

U.S. Pat. No. 4,267,064 shows essentially the same invention as the above U.S. Pat. No. 4,248,726 except that the '064 patent discloses and teaches the use of polyether polyols having viscosities of 25 to 50 cs at 98.8° C. The high molecular weight polyglycols of this patent are insoluble in R134a at 25° C.

U.S. Pat. No. 4,755,316 discloses compositions containing one or more polyether polyols for lubricating refrigeration compressors using R134a. However, it has been found (control D) that the polypropylene glycol based on trimethylolpropane mentioned in the patent is unexpectedly inferior to the polyglycols used herein.

Lubricants for various refrigeration compressors are also known from Japanese patent J57051795. This patent suggests that a high molecular weight polypropylene glycol based on glycerine might be useful as a refrigeration lubricant. However, the upper solution critical temperature of this glycol is not adequate as can be seen from Control E herein.

SUMMARY OF THE INVENTION

The invention comprises polyether polyol lubricant compositions with hydrofluorocarbon and hydrochlorofluorocarbon refrigerants which have upper solution critical temperatures equal to or greater than 60° C. In general, the compositions consist of (A) a refrigerant selected from the group consisting of hydrofluorocarbons and hydrochlorofluorocarbons, and (B) a polyether polyol which has a viscosity of greater than 80 centistokes at 38° C. and the formula

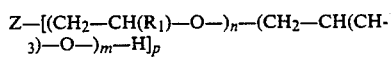

where
Z is the residue of an active hydrogen compound selected from the group consisting of glycerine, pentaerythritol, sorbitol, ethylene diamine, diethylene triamine, hydrazine. ethanolamine, diethanolamine, triethanolamine, isopropanolamine, diisopropanolamine and triisopropanolamine, $R_1$ is hydrogen, ethyl, or mixtures thereof, n is 0 or a positive number, m is a positive number, n+m is a number having a value which will give a polyether polyol with a number average molecular weight range from about 400 to about 2000, p is an integer having a value equal to the the number of active hydrogens of Z.

The polyol lubricant compositions have a preferred upper solution critical temperatures in the range from about 65° C. to about 110° C.

The polyether polyols have a preferred viscosity in the range from about 90 to about 800 centistokes at 38° C.

DETAILED DESCRIPTION OF THE INVENTION

Examples of the polyether polyols or polyoxyalkylene polyols used in this invention are those derived from ethylene oxide, propylene oxide, 1-2, or 2-3 butylene oxide. The above oxides may be polymerized alone, i.e., homopolymerized or in combination. The combined oxides may also be combined in a random or block addition. While some of the above compounds may be of a hydrophilic nature, those of a hydrophobic nature are preferred, such as those derived from propylene oxide, butylene oxides or combinations thereof.

Examples of suitable polyoxyalkylene glycols are those derived from ethylene, propylene, and butylene oxides wherein the alkylene oxides are initiated from a compound having 3 to 6 active hydrogens in a known manner. These polyether polyols and their preparation are well known from the book "Polyurethanes" by Saunders and Frisch, Interscience Publishers (1962), pages 33-39. This book is incorporated by reference herein.

Examples of suitable initiator compounds which are employed to prepare the above polyether polyols are compounds having 3-6 active hydrogens such as for example, glycerine, pentaerythritol, sorbitol, ethylene diamine. diethylene triamine, hydrazine, ethanolamine, diethanolamine, triethanolamine, isopropanolamine, diisopropanolamine and triisopropanolamine.

The foregoing polyether polyols should have a number average molecular weight range from about 400 to 2000 and preferably in the range 400 to 1500.

The final lubricant compositions of this invention may contain effective amounts of ashless additives, such as antioxidants, corrosion inhibitors, metal deactivators, lubricity additives, extreme pressure additives and viscosity index improvers as may be required.

Examples of useful ashless antioxidants which can be used herein are phenyl naphthylamines, i.e., both alpha and beta-naphthyl amines; diphenyl amine; iminodibenzyl; p,p-dibutyl-diphenylamine: p,p'-dioctyldiphenylamine; and mixtures thereof. Other suitable antioxidants are hindered phenolics such as 6-t-butylphenol, 2,6-di-tbutylphenol and 4-methyl-2,6-di-t-butylphenol and the like.

Examples of suitable ashless metal corrosion inhibitors are commercially available, such as Irgalube 349 from Ciba-Geigy. This inhibitor compound is an aliphatic amine salt of phosphoric acid monohexyl ester. Other useful metal corrosion inhibitors are NA-SUL DTA and NA-SUL EDS from the White Chemical Company (diethylenetriamine dinonylnapthalene sulfonate and ethylene diamine dinonylnaphthalene sulfonate) and N-methyl oleosarcosine, respectively.

Examples of suitable ashless cuprous metal deactivators are imidazole, benzimidazole, pyrazole, benzotriazole, tolutriazole, 2-methyl benzimidazole, 3,5-dimethyl pyrazole, and methylene bis-benzotriazole.

An effective amount of the foregoing additives for use in a air conditioning compressor is generally in the range from 0.1 to 5.0% by weight for the antioxidants, 0.1 to 5.0% by weight for the corrosion inhibitors, and 0.001 to 0.5 percent by weight for the metal deactivators. The foregoing weight percentages are based on the total weight of the polyether polyols. It is to be understood that more or less of the additives may be used depending upon the circumstance for which the final composition is to be used.

Examples of refrigerants useful in this invention are hydrochlorofluorocarbons such as chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1fluoroethane and 1-chloro-1,1-difluoroethane.

Other examples of refrigerants useful in this invention are hydrofluorocarbons such as 1,1,1,2-tetrafluoroethane, 1,1-difluoroethane, 1,1,1-trifluoroethane, 2,2-difluoroethane, trifluoromethane, methylene fluoride, methyl fluoride, difluoroethylene and pentafluoroethane.

The general procedure for the preparation of the controls and the examples of present invention with the refrigerant R134a is set forth below. The data is given in the following Table.

The selected polyol is vacuum stripped. Glass ampules are washed with acetone and vacuum dried at 110° C. The empty ampule or tube is weighed and the mixture to be evaluated is syringed into the tube. The tube is re-weighed to determine the weight of lubricant. The tube is evacuated to remove air and then immersed in a dry ice/methylene chloride slurry in a Dewar flask. The R134a is transferred at a pressure of 8 psig into the tube to give the desired lubricant concentration. The filled ampule was then disconnected and allowed to equilibrate at room temperature, 25° C. The ampules were placed in a controlled temperature bath and the temperature varied from −20° to 85° C. while observing for phase separation. The temperature of phase separation is called the upper solution critical temperature (USCT) and is reported in degrees C. Temperatures above 85° C. were not investigated because of pressure limitations of the glass ampule apparatus. Systems with USCT's above this temperature measurement limit are denoted as greater than 85° C.

TABLE

R134a Upper Solution Critical Temperature Data

| Run Number | Lubricant-Neat Viscosity- (in cs @ 100° F. or 38° C.) | Lubricant Wt % in R134a | USCT °C. |
|---|---|---|---|
| Control A | n-butanol + PO to 1170 Mol Wt-57 cs | 16 | 60 |
| Control B | Propylene glycol + PO to 2000 Mol Wt-160 cs | 12 | <25 |
| Control C | Propylene glycol + PO to 1000 Mol Wt-73 cs | 25 | 70 |
| Control D * | Trimethylol propane + PO to 720 Mol Wt-133 cs | 16 | 52 |
| Control E ** | Glycerine + PO to 3000 Mol Wt-230 cs viscosity index 180 | 22 | <25 |
| Example 1 | Glycerine + PO to 700 Mol Wt-108 cs | 16 | 78-80 |
| Example 2 | Ethylene diamine + PO to 511 Mol Wt-753 cs | 15 | >85 |
| Example 3 | Ethylene diamine + PO to 951 Mol Wt-263 cs | 15 | 70 |

* This control which is similar to the TPF-740 example of U.S. Pat. No. 4,755,316 (Magid et al.) shows that the lubricant has a USCT value that is too low.
** This control which is similar to the examples of U.S. Pat. No. 4,267,064 (Sasaki et al.) and U.S. Pat. No. 4,2448,726 (Uchinuma et al.) shows that high molecular weight lubricants have a USCT value that is much too low.

I claim:
1. Fluid compositions for use in compression refrigeration which have an upper solution critical temperature equal to or greater than 65° C. comprising
  (A) a refrigerant selected from the group consisting of hydrofluorocarbons and hydrochlorofluorocarbons, and
  (B) a liquid lubricant base selected from the group consisting of polyether polyols which (1) have a viscosity of greater than 80 centistokes at 38° C. and (2) are represented by the formula

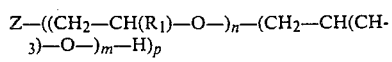

where

Z is the residue of an active hydrogen compound selected from the group consisting of glycerine, pentaerythritol, sorbitol, ethylene diamine, diethylene triamine, hydrazine, ethanolamine, diethanolamine, triethanolamine, isopropanolamine, diisopropanolamine and triisopropanolamine, $R_1$ is hydrogen, ethyl, or mixtures thereof, n is 0 or a positive number, m is a positive number, n+m is a number having a value which will give a polyether polyol with a number average molecular weight range from about 400 to about 2000, and p is an integer having a value equal to the number of active hydrogens of Z.

2. The composition of claim 1 wherein said lubricant composition has an upper solution critical temperature about 65° C. to about 110° C.

3. The composition of claim 1 wherein said polyether polyols have a viscosity in the range from about 90 to about 800 centistokes at 38° C.

4. The composition of claim 1 wherein said fluid composition contains a concentration of about 1 to about 25% by weight of component (B) based on the combined weight of components (A) and (B).

5. The composition of claim 1 wherein said hydrochlorofluorocarbons are selected from the group consisting of chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1-fluoroethane and 11-chloro-1,1-difluoroethane.

6. The composition of claim 1 wherein said hydrofluorocarbons are selected from the group consisting of 1,1,1,2-tetrafluoroethane, 1,1,2,2-tetrafluoroethane, 1,1,1-trifluoroethane, 1,1-difluoroethane, trifluoromethane, methylene fluoride, methyl fluoride, difluoroethylene and pentafluoroethane.

7. Fluid compositions for use in compression refrigeration which have an upper solution critical temperature equal to or greater than 60° C. comprising (A) a refrigerant selected from the group consisting of hydrochlorofluorocarbons and hydrofluorocarbons, and (B) a liquid lubricant base selected from the group consisting of polyether polyols which (1) have a viscosity of greater than 80 centistokes at 38° C. and (2) are represented by the formula $$Z-((-CH_2-CH(CH_3)-O-)_n-H)_p$$

where

Z is the residue of an active hydrogen compound selected from the group consisting of glycerine, pentaerythritol, sorbitol, ethylene diamine, diethylene triamine, hydrazine, ethanolamine, diethanolamine, triethanolamine, isopropanolamine, diisopropanolamine anad triisopropanolamine, n is a number having a value which will give a polyether polyol with a number average molecular weight range from about 400 to about 2000, and p is an integer having a value equal to the number of active hydrogens of Z.

8. The composition of claim 7 wherein said lubricant composition has an upper solution critical temperature of about 65° C. to about 110° C.

9. The composition of claim 7 wherein said polyether polyols have a viscosity in the range from about 90 to about 800 centistokes at 38° C.

10. The composition of claim 7 wherein said fluid composition contains a concentration of about 1 to about 25% by weight of lubricant composition.

11. The composition of claim 7 wherein said hydrochlorofluorocarbons are selected from the group consisting of chlorodifluoromethane, chlorofluoromethane, 2,2-dichloro-1,1,1-trifluoroethane, 1-chloro-1,2,2,2-tetrafluoroethane, 2-chloro-1,1,2,2-tetrafluoroethane, 1-chloro-2,2,2-trifluoroethane, 1,1-dichloro-1-fluoroethane and 1-chloro-1,1-difluoroethane.

12. The composition of claim 7 wherein said hydrofluorocarbons are selected from the group consisting of 1,1,1,2-tetrafluoroethane, 1,1,2,2-tetrafluoroethane, 1,1,1-trifluoroethane, 1,1-difluoroethane, trifluoromethane, methylene fluoride, methyl fluoride, difluoroethylene and pentafluoroethane.

13. Fluid compositions for use in compression refrigeration which have an upper solution critical temperature from about 65° C. to about 110° C. comprising (A) 1,1,1,2-tetrafluoroethane, and (B) a liquid lubricant base selected from the group consisting of polyether polyols which (1) have a viscosity from about 90 to about 800 centistokes at at 38° C. and (2) are represented by the formula $$Z-((-CH_2-CH(CH_3)-O-)_n-H)_p$$

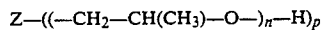

where

Z is glycerine, n is a number having a value which will give a polyether polyol with a number average molecular weight range from about 400 to about 2000, and p is 3.

14. Fluid compositions for use in compression refrigeration which have an upper solution critical temperature from about 65° C. to about 110° C. comprising (A) 1,1,1,2-tetrafluoroethane, and (B) a liquid lubricant base selected from the group consisting of polyether polyols which (1) a viscosity from about 90 to about 800 centistokes at 38° C. and (2) are represented by the formula $$Z-((-CH_2-CH(CH_3)-O-)_n-)H_p$$

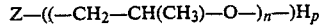

where

Z is ethylene diamine, n is a number having a value which will give a polyether polyol with a number average molecular weight range from about 400 to about 2000, and p is 4.

15. A method of lubricating and/or operating compression refrigeration equipment which comprises using as the lubricant the composition of claims 1, 2, 3, 4, 5, 6, 7, 8, 9, 10, 11, 12, 13, or 14.

* * * * *

UNITED STATES PATENT AND TRADEMARK OFFICE
CERTIFICATE OF CORRECTION

PATENT NO. : 5,021,180
DATED : June 4, 1991
INVENTOR(S) : Phillip W. McGraw

It is certified that error appears in the above-indentified patent and that said Letters Patent is hereby corrected as shown below:

Column 5, line 34, change "thane and 11-chloro-" to read --thane and 1-chloro--.

Column 5, line 60, change "anad" to read --and--.

Column 5, line 63, change "illegible" to read --"weight".

Column 6, line 15, change "2,2-dichloro1, 1, 1-trifluoroethane, 1-chlorol, 2,2,2,-" to read --2,2-dichloro-1,1,1-trifluoroethane, 1-chloro-1,2,2,2- --.

Signed and Sealed this

Twenty-second Day of February, 1994

Attest:

BRUCE LEHMAN

*Attesting Officer*   Commissioner of Patents and Trademarks

UNITED STATES PATENT AND TRADEMARK OFFICE
CERTIFICATE OF CORRECTION

PATENT NO. : 5,021,180

DATED : June 4, 1991

INVENTOR(S) : Philip W. McGraw

It is certified that error appears in the above-identified patent and that said Letters Patent is hereby corrected as shown below:

Column 5, line 17; delete the word "lubricant".
Column 5, line 19; change "about 65°C" to read -- from about 65°C--.
Column 6, line 3; delete the word "lubricant".
Column 6, line 5; delete the word "of" and insert the word --from--.
Column 6, line 11; delete "lubricant composition" and insert --
  component (B) based on the combined weight of components
  (A) and (B). --
Column 6, line 46; change "a liquid lubricant base" to read --
  a lubricant composition which comprises a liquid lubricant base --.
Column 6, line 47; change "which (1) a" to read -- which (1) has a --.
Column 6, line 60; delete the words "using as the lubricant" and
  insert -- circulating --.
Column 6, line 62; after the number "14" please insert -- through
  said compression refrigeration equipment --.

Signed and Sealed this

Twenty-third Day of April, 1996

Attest:

BRUCE LEHMAN

*Attesting Officer*   *Commissioner of Patents and Trademarks*